April 24, 1962  H. WEBER ETAL  3,031,362
METHOD AND MEANS FOR PRODUCING EXPLANATORY
TEXTS ON THE PICTURES OF FILMS
Filed Jan. 5, 1959  2 Sheets-Sheet 1

INVENTORS
Hermann Weber and Jean Weber
BY
ATTORNEY

April 24, 1962 H. WEBER ETAL 3,031,362
METHOD AND MEANS FOR PRODUCING EXPLANATORY
TEXTS ON THE PICTURES OF FILMS
Filed Jan. 5, 1959
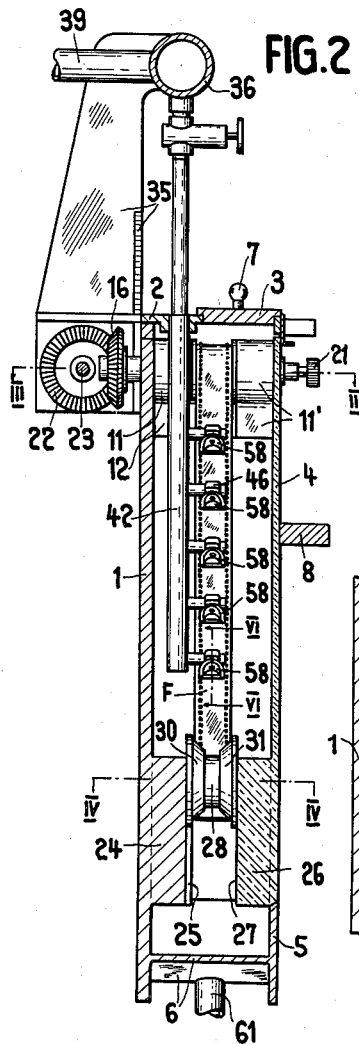
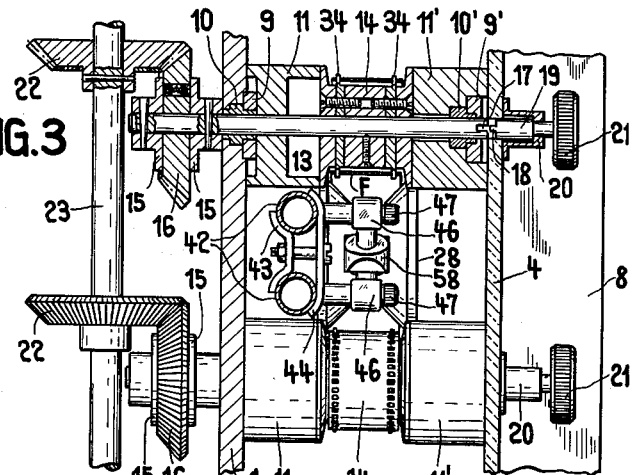
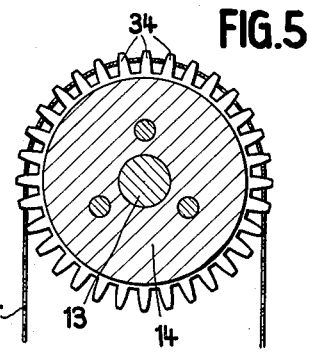
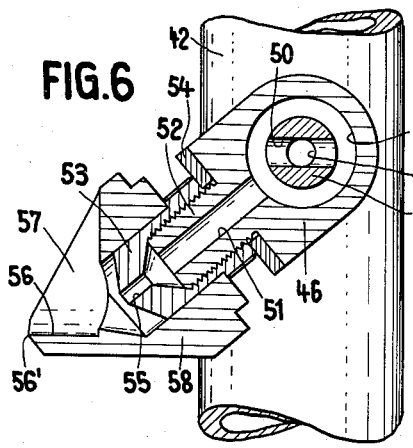
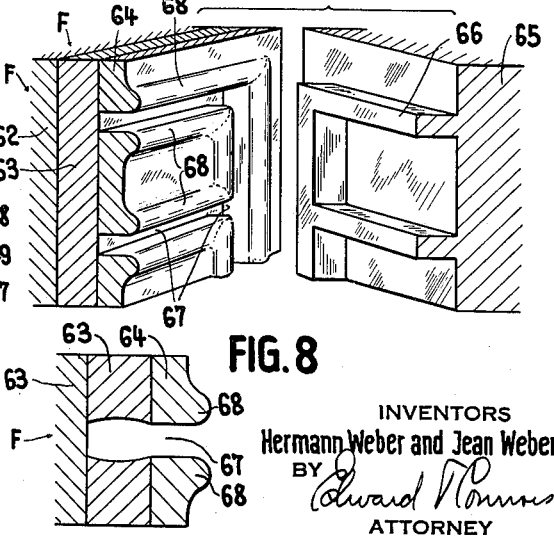
INVENTORS
Hermann Weber and Jean Weber
BY
ATTORNEY

3,031,362
METHOD AND MEANS FOR PRODUCING EXPLANATORY TEXTS ON THE PICTURES OF FILMS

Hermann Weber, Selhofenstrasse 25, Wabern, near Bern, Switzerland, and Jean Weber, Gurtengartenstrasse 9, Spiegel, near Bern, Switzerland
Filed Jan. 5, 1959, Ser. No. 785,088
Claims priority, application Switzerland Mar. 5, 1952
2 Claims. (Cl. 156—8)

This application is a continuation-in-part of our U.S. patent application Serial No. 339,022, filed February 26, 1953, now abandoned.

Our invention relates to a method for producing explanatory texts on the pictures of cinematographic films, in which at least the photographic layer of the film with the exception of the areas corresponding to the letters of the texts to be produced is masked by a protective layer, whereafter an etching agent is allowed to act on the said areas for removing the photographic layer.

Processes of this kind are known for instance from U. S. Patents Nos. 2,051,603 and 2,490,442 issued to R. Hruska and N. Kagansky respectively. In either of these known processes the film is coated with a protective layer of wax or paraffin, that is with a relatively soft material adapted to be deformed by mechanical pressure, whereafter this protective layer is removed on the areas corresponding to the letters of the explanatory texts to be produced by means of typographic characters of metal by melting and displacing the soft protecting material. Hruska has proposed to pass the film prepared in this way through a bath of an etching solution for dissolving the photographic layer of the film whereas Kagansky has proposed to apply the etching solution to the film by means of rollers dipping in a bath.

We have produced explanatory texts or titles on films for many years in accordance with the known methods of Hruska and Kagansky but these methods never satisfied entirely and proved to be practically inapt for treating modern color films, because the photographic layers used on the films were not destroyed and removed on the areas covered by the letters of the explanatory texts to such a degree that the latter appear with the required legibility. Particularly, such letters had no sharp contours and often photographic layers of multi-layer color films were not entirely removed so that dark colored titles used to appear instead of brilliant white titles.

We have found that one of the reasons for the unsatisfactory etching action of the known methods resides in the fact that the etching action is much too slow when the etching solution is applied in a bath or by means of rollers because the exchange and agitation of the etching solution in the relatively deep and narrow gaps formed in the protective layer which has to be of a relatively great thickness when made of a soft mechanically workable material such as wax or paraffin, is not sufficient and therefore the etching action must be continued for a relatively long time period. It was found, however, that the said soft protecting materials such as wax or paraffin are chemically and mechanically attacked by the etching solutions usually employed and become brittle and fragile after a relatively short time. Therefore, the protecting layer became cracked and was loosened from the photographic layer in the neighbourhood of the letters to be etched away, this being the reason why under-etching of the protecting layer resulting in unsharp contours and even illegible general forms of the letters was excessive. It was a common practice to clean the film after the etching treatment by spraying water onto the film, as shown in the above patent to Kagansky. We have found, when applying rinsing water to the film etched in accordance with the methods of Hruska or Kagansky, that the protecting layer already weakened by the etching solution was immediately damaged by the spray of rinsing water. Since this experience was made by anyone treating films in the manner disclosed by Hruska or Kagansky it was generally believed that it would be impossible to spray the etching solution onto the film as it is generally known for etching plates in the graphical art as disclosed for instance in the U.S. Patent No. 2,360,676 to C. L. Henderson et al. or in the British Patent No. 646,373 to M. R. Stewart. In the graphical art as exemplified by the just mentioned patents hard photosensitive and relatively thin protecting layers are used. which easily resist to the mechanical impact of the spray of etching solution. The protecting layers of soft materials such as wax and paraffin have to have a relatively great thickness in order to reliably cover the film where etching of the same is to be prevented and therefore it was generally believed that the soft protecting material offering a relatively great area of attack for the etching solution due to its thickness would be washed off when the etching solution would be sprayed against the film as it had been experienced when spraying rinsing water against the film.

It is the first object of this invention to do away with the above and other prejudices and showing means allowing to spray the etching solution onto the film having a relatively thick protecting layer of a soft material such as wax or paraffin.

It is a further object of the invention to so reduce the etching time by properly spraying the etching solution against the film that the protecting layer will not yet become too brittle and fragile during the shortened etching period.

It is a further object of this invention to shorten the etching time by properly heating the etching agent to a degree keeping the protecting material such as wax or paraffin in a plastic state thereby reducing its tendency to become brittle and fragile, but not softening the protecting material too much so that it will withstand the mechanical impact of the etching solution. Applicants have found that by proper choice of the treating temperature of the etching solution slightly above room temperature the mechanical qualities of the protecting material may even be improved.

The letters to be produced on the films are of extremely small size in the order of ½ mm. or less and consequently the width of the lines forming the characters of the texts and the gaps to be formed in the protecting layer are very thin, in the order of .01 to .02 of a millimeter. It is a further object of this invention to apply the etching solution to the film in the form of a very thin and sharp flat jet capable of entering the narrow gaps in the protective layer. It is a further object to produce a flat, thin jet which is absolutely continuous so that the etching solution is continuously and equally applied to all areas to be etched and the etching action is equalized and therefore shortened and impacts of the etching solution against the protecting layer are substantially avoided.

Photographic and cinematographic films are made of light and soft materials having small own mechanical resistance. When it is desired to spray the etching solution against such films it is necessary that the films will not deflect laterally under the action of the spray or sprays applied against the film, in order not to vary the distance between the spray nozzles and the film when the latter is passing before the nozzles. It is a further object of this invention to provide means for properly spacing the film from the spray nozzles, by feeding the film in loops and loading the lower bends of the loops by rollers comprising a weight and carried by the film, whereby the straight portions of the film loops facing the spray nozzles are spanned and kept in proper position relatively to the nozzles.

While Hruska and Kagansky remove the protecting layer by means of heated stencils, whereby the protective layer is melted away on the areas corresponding to the letters or characters to be produced, we have found that it is an advantage to remove the protecting layer by purely mechanical means in that the protecting layer is laterally pressed away when in plastic state. By this mechanical displacement of the material at a temperature of about 30–40° C. the material is solidified and densified in the neighbourhood of the gaps formed where the letters or characters of the text have to appear and therefore, the material easier resists the mechanical attack of the etching agent sprayed against it.

This invention also relates to an apparatus for carrying out the method as set out above, this apparatus being broadly characterized by a number of upper return pulleys and a number of lower return pulleys, the film being carried in loops over the said upper and lower return pulleys, and vertical rows of nozzles being disposed between pairs of adjacent straight portions of the film loops.

Further objects and advantages of the invention will be apparent from the following description and from the accompanying drawings which show, by way of example, an embodiment of the invention, and in which:

FIG. 2 is a section along the line II—II in FIG. 1,

Figure 1:
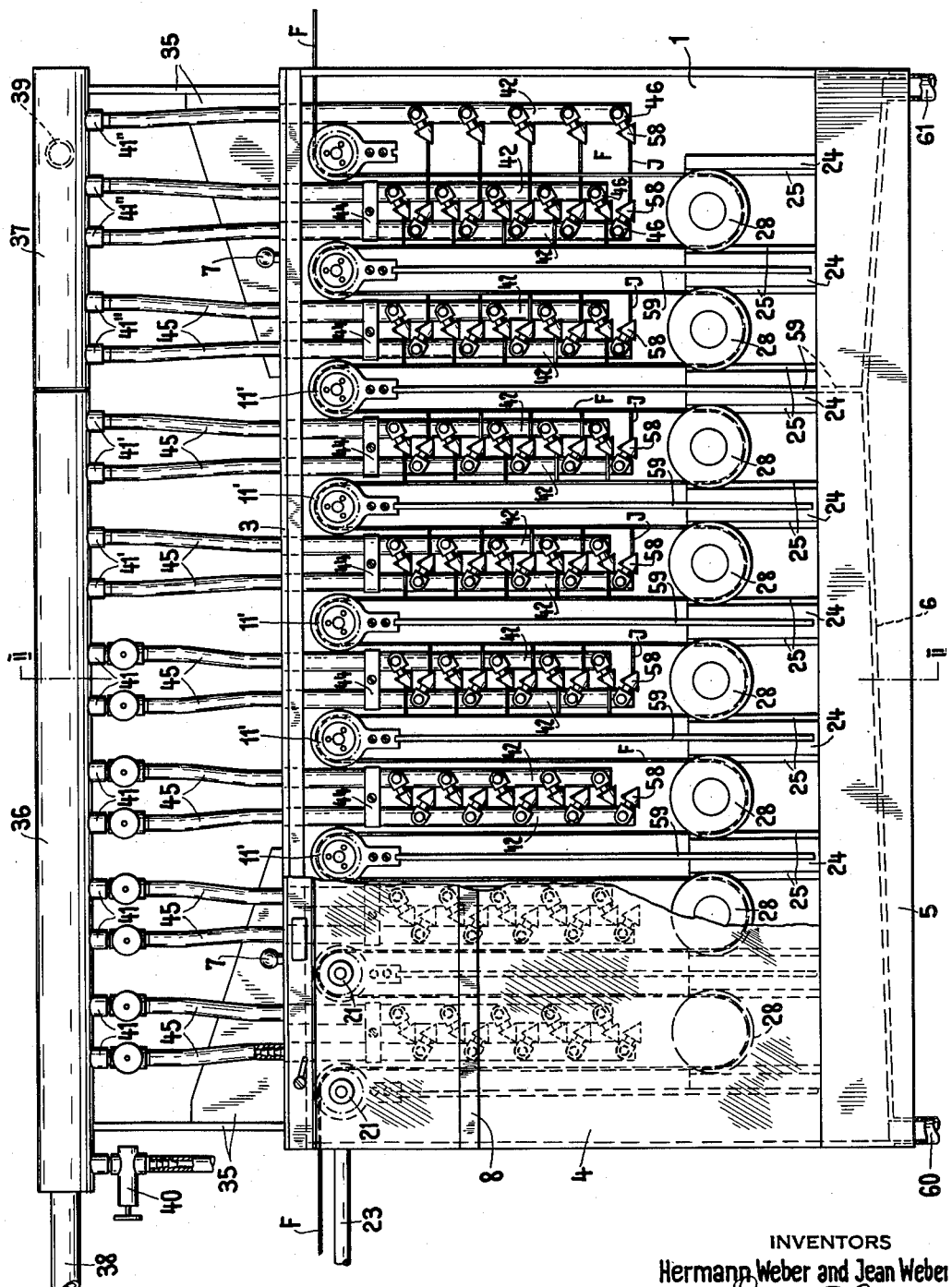
FIG. 1 is a side elevation of the apparatus according to this invention with its side wall partially removed.

FIG. 3 is a section along the line III—III in FIG. 2 with parts in the section plane partially in elevation, FIG. 4 is a section taken along the line IV—IV in FIG. 2, FIG. 5 is a section of a return pulley of the apparatus, FIG. 6 is a section of a spray nozzle of the apparatus on an enlarged scale, FIG. 7 is a perspective view of a film portion and a portion of the stencil on a substantially enlarged scale and FIG. 8 is a sectional view illustrating the etching effect on the film.

The apparatus generally shown in FIGS. 1 and 2 has a treating casing comprising a back wall 1, a fixed cover portion 2, a removable cover portion 3, a removable front portion 4, a fixed front portion 5 and a bottom 6. The removable parts 3 and 4 are equipped with handles 7 and 8 respectively. By means of rings 9 bearings 10 and protecting cylinders 11 for such bearings are fixed on the back wall 1 of the treating casing. Similar rings 9' and bearings 10' are mounted in protecting cylinders 11' attached to the back wall 1 of the casing by means of supporting blocks 12 (FIG. 2). Driving shafts 13 are rotatably mounted in the bearings 10 and 10', such shafts carrying each an upper return pulley 14 rotatable with little clearance between the protecting cylinders 11 and 11'. At its end projecting from the rear wall 1 of the casing each shaft 13 has two discs 15 enclosing between them a bevel gear 16 rotatably mounted on the shaft 13. However, free rotation of the bevel gears 16 on shafts 13 between discs 15 is opposed by two friction pads inserted into a bore of the bevel gears 16 and pressed against discs 15 by a pressure spring inserted between such friction pads. The end of the shaft 13 facing the removable front wall 4 of the casing has a diametrical slit 17 adapted for cooperation with a cam 18 provided at the inner end of an adjusting shaft 19 rotatably mounted in a bearing sleeve 20 attached to the front wall 4. By inward pressure of the shafts 19 by means of control knobs 21 fixed at their outer end the cam 18 may be engaged with the slit 17 of the shaft 13 for individually adjusting each shaft 13 and the return pulley 14 mounted thereon. Bevel gears 16 mesh with bevel gears 22 mounted on a common driving shaft 23 driven at a suitable speed by means of a motor (not shown). Driving shaft 23 is mounted in plates 24 projecting from the rear side of the casing.

The back wall 1 is integral with guide blocks 24 having at their fore edges guiding recesses 25, and the front wall 4 is integral with guide blocks 26 having plane guiding surfaces 27. Lower return pulleys 28 are guided between guiding blocks 24 and 26 with little clearance, whereby vertical displacement of such pulleys is allowed but displacement in a horizontal plane is practically prevented. This lower return pulley has a weight 29 embedded in a tight shell of chemically resistant material, such as plastic material, stainless steel or the like. The pulley has two oppositely conical supporting surfaces 30 and 31 respectively whereon the film F only applies with its outer edges. The pulleys 28 also have outer flanges 32 and 33 constituting a guide for the film in order to maintain the latter on the conical supporting faces 30 and 31, so that the film will never be supported on portions other than its outer rim. The upper return pulleys 14 of which FIG. 5 is an enlarged sectional view, are equipped with two rows of teeth 34 engaging the perforations of the cinematographic film. Since the cross section of the base of teeth 34 exceeds the size of the film perforations the film is carried on the teeth and consequently the teeth will only engage edge portions of the film perforation. Thus, the return pulleys are so designed that the film is never supported on its face during its treatment in the etching casing and therefore the soft protecting layer applied to the film cannot possibly be damaged by the return pulleys.

Supporting structures 35 are mounted on the back wall 1 of the treating casing, a distributing pipe 36 for the etching agent and a distributing pipe 37 for rinsing water being fixed to the upper end of such supporting structures. The etching solution is fed from a pump (not shown) to the inlet piece 38 of the distributing pipe 36, whereas the rinsing water is fed through an inlet piece 39 to the distributing pipe 37. The distributing pipe 36 may be discharged by means of a discharging cock 40. In the embodiment shown in the drawings eight connecting pieces 41 with shut-off cocks and four connecting pieces 41' without shut-off cocks are provided on the distributing tube 36 whereas five connection pieces 41" without shutoff cocks are provided on the distributing tube 37. There are connecting pieces 41 for each of pipes 42. The pipes 42 extend vertically between opposite straight portions of the film loops, such pipes 42 being supported in the fixed cover portion 2 and maintained at the desired distance by means of spacing yokes 43 and 44 (FIGS. 1 and 3). The communication between connecting pieces 41 and tubes 42 is established by means of flexible tubes 45 of plastic material, such tubes 45 being removably attached to the connecting pieces 41 and/or to the tubes 42.

Tubular nozzle carriers 46 are connected to the tubes 42 by means of hollow screws 47 passing through a central bore 48 of the nozzle carriers. A central canal 49 of each screw 47 communicates with the interior of tubes 42 and the etching agent contained in the tubes will flow through this canal 49 and a cross bore 50 of the screw 47 into the bore 48 of the nozzle carrier, from which the agent will flow into the nozzle through the canal 51 of a connecting piece 52 of the nozzle carrier. The nozzle has a connecting tube 53 screwed to the connecting piece 52 of the nozzle carrier and tightened by means of a sealing disc 54. The connecting tube 53 has a circular nozzle opening 55 directed against a plane deflecting surface 56 of a recess 57 of a substantially conical nozzle body 58. As clearly disclosed in FIG. 6 the common axis of the connecting pieces 52 and 53 and of the circular nozzle 55 is inclined downwardly by approximately 40°, but the deflecting surface 56 is in a horizontal plane so that the jet of circular cross section leaving the nozzle opening 55 is flattened on the surface 56 and deflected so that the nozzle produces an extremely thin and sharp flat jet in a horizontal plane. As may be seen in FIG. 1 the jets J of nozzles connected to the right-hand tube 42 of a pair of such tubes are directed to the left straight portion of the film loop whereas the jets J of nozzles connected to the left-hand tube 42 of each pair of such tubes are directed to the right straight portion of the film loops. The distance from the fore edge 56' of the deflecting surface 56 to the film is 3 cm. The circular nozzle 55 has a diameter of 1.4 mm. and when the flat jet is spread to a width of 25 mm., thereby covering the width of the pictures of a usual cinematographic film having a total width of 35 mm., the thickness of the flat jet will be in the order of .05 to .06 mm. Nozzles spraying in the same direction are at a distance of about 6 cm. from each other.

In operation the four last tubes 42 connected to the connecting pieces 41' are always fully operative whereas the tubes 42 and the nozzles connected thereto may be put into operation as desired by opening or closing the shut-off cocks. When a reduced number of nozzles is on operation it is to be avoided that etching agent be sprayed onto the film before the latter has reached the operating nozzles. For this purpose, separating walls 59 are provided between separate pairs of nozzle-carrying tubes 42. Further, a separating wall 59' is extended to the bottom 6 of the treating casing thereby dividing the latter into an etching chamber and a rinsing chamber. Each of these chambers has an outlet tube 60 and 61 respectively. The etching agent leaving the etching chamber through outlet tube 60 is fed back through the above mentioned pump and the inlet tube 38 to the distributing tube 36 from where it is again fed to the nozzles, so that a closed circuit is formed for the etching agent. The pressure of the etching agent fed to the nozzles may be varied by well known means between values of 0.3 to 0.8 kg./cm., whereby the lower pressures are used for treating relatively soft films such as black-white films and the higher and highest pressures are used for films having particularly thick and/or resistant photographic layers, such as color films. At the same time the number of operating nozzles is varied from twenty nozzles always on operation to the possible maximum of nozzles, viz. 60 in the embodiment shown in FIG. 1. However, more nozzles may be added and apparatus having up to 80 nozzles have been built for treating modern, extremely resistant color films. Further, means for heating the etching agent to a predetermined temperature, preferably controlled by a thermostat, may be inserted into the said closed circuit for the etching agent at any suitable place. By such heating means the etching agent may be heated to adjustable temperatures between room temperature, that is 18–20° C., and 45° C. Again the lower temperatures are used when treating soft films whereas the higher temperatures are used when etching resistant films, particularly color films.

The film to be treated is fed into the treating casing through a slit on the left-hand end wall (FIG. 1) and is fed in loops over the upper and lower return pulleys past the nozzles and leaves the treating casing through a slit in the right-hand end wall of the casing. Prior to the treatment in the etching apparatus the film is covered in a well known manner with a layer of paraffin having a thickness of .01 to .02, preferably .015 of a millimeter. When this protective layer is applied and has solidified to a relatively hard but still plastic state the paraffin is pressed away on the areas where the characters or letters of the explanatory text have to appear after the etching treatment. This purely mechanical removal of the protecting layer is shown in FIG. 7, wherein a small portion of the film F is shown on the left whereas the stencil for removing the paraffin is shown on the right. The film F has a carrier 62, a photographic layer 63 having a thickness in the order of up to .025 of a millimeter and the said protecting layer 64 of paraffin. The stencil has a plate 65 whereon the characters or letters 66 are formed higher than the initial thickness of the protective layer 64 applied to the film. For removing the protecting layer the stencil is pressed into the same whereby the still plastic material is removed sidewise and is thereby solidified and densified in the neighbourhood of the characters and the thickness of the material is also slightly increased along the gaps 67 formed in the protective layer whereby small beads 68 are formed on either side of the gaps 67. When treated by the stencil the film is fed into the treating casing as explained. The speed of the film is adjusted to 15–19 cm./sec. and the film length contained in the etching chamber is 5 meters, so that the film passes through the etching chamber in a time of 25–30 seconds. However, this is a maximum for the effective etching time because an etching time of 25–30 seconds is only obtained when all nozzles are operative, whereas the etching time is accordingly shorter when a part only of the available nozzles are in operation. After being treated by the last flat jet of etching solution the film immediately passes into the rinsing chamber wherein the etching agent is washed off the film and the etching action is thus immediately stopped.

The etching agent may be concentrated nitric acid ($NO_3H$), but preferably concentrated natrium-hypochlorite ($ClONa$) or a solution of the latter having a concentration of 50 to 100% is used. The highest concentration is used for treating soft films, for instance black-white films whereas lower concentration is used for etching resistant films such as color films, whereby addition of water results in higher etching action.

As stated above, it is a primary object of this invention to so adjust the form of the jets, the kind and concentration of the etching agent and the temperature of the latter, and the pressure at which the etching agent is fed to the nozzles that the film is etched in a time as short as possible. However, limits are given by the specific characteristics of the protective layer consisting of a relatively weak and soft material adapted to be removed from the film by simple mechanical pressure, at least for the values of the temperature of the etching agent and for the pressure with which this agent is sprayed onto the film. It was found that within the limits given above for the different values it is possible to safely treat the film within the maximum time of 25 to 30 seconds without damaging the protective layer. Particularly the protective layer is not substantially attacked chemically by the etching agent within this relatively short time and therefore very clean titles are obtained. Further, when increasing the temperature of the etching agent the protecting material is somewhat softened and it has been found that the layer perfectly resists the impact of the etching agent in this softened state because the material is no longer brittle and cracky. Further by the impact of the etching agent the protecting layer is pressed against the film and is held in contact with the film, whereby underetching of the film is effectively opposed. Therefore very little underetching is obtained as indicated by the gap etched into the photographic layer 63 shown in FIG. 8.

It is of particular importance to use a very sharp flat areal jet of etching agent. Such a flat jet easily enters into the relatively narrow gaps 67 of the protecting layer having a width in the order of .01–.02 of a millimeter and cause a very intensive exchange of the etching agent at the ground of such gaps. Further, due to the flat form of the jet every surface unit of the film is equally treated and therefore the etching action is absolutely equal over the full area of the films and of the letters of the text to be produced. This is very important because parts of the letters which have been completely etched should no longer be sprayed when the etching treatment must be continued for completely etching other parts thereof. Should such treatment be continued the letters would appear wider in the places where a more intensive etching action has taken place thus resulting in an unaesthetic, illegible text. However, when using a flat jet extending transversally over the width of the film picture an absolutely uniform etching is obtained even when only a few nozzles are in operation.

The use of a flat thin jet of etching agent having a thickness of .05 to .06 mm. and applying this thin jet onto a film continuously displaced at a relatively high speed of 15–19 cm./sec. have proved to be of particular importance because under these conditions the time during which the soft protective layer is exposed to the action of the jet at a time is extremely short. Assuming a thickness of the jet of .06 of a millimeter and a film speed of 18 cm./sec. the time during which one particular film portion is under the action of one jet is 0.3 millisecond. During this extremely short time it is practically impossible that the protective layer could be damaged by the jet. However, the time is sufficient for allowing entrance of the jet into the gaps formed in the protective layer and causing thorough exchange of the etching agent in such gaps. Therefore, it is one particular object of this invention to act on the film during very short periods of less than one millisecond at a time but to repeat this action for at least twenty times. In other words, it was found that damage of the soft and weak protective layer may be avoided when the action of each particular jet is limited to a time as short as possible but the number of spaced jets is multiplied. In this manner the total action of the jets is sufficient for rapidly and properly etching the photographic layer but damage of the protective layer is avoided.

It is a specific problem to maintain the film on its prescribed path and to avoid deflection of the film under the action of the jets sprayed against it. It is impossible to guide the film by structures over which the film glides during its passage through the etching chamber because any friction on the film would damage or remove the protecting layer and the film would be etched in places where no etching has to take place. We have overcome this difficulty by forming loops of the film and spanning such loops by means of return pulleys 28 comprising a weight and having a total weight of about 500 to 600 grams so that a pull of at least 200 gr. is set up in each of the film portions forming a loop. This pull is very important because it opposes deflection of the film under the action of the jet of etching agent. Too little or no pull in the film would result in excessive deflection and bending of the film in the places where the sharp linear jet hits the film surface whereby the combined effect of the film deflection and of the impact of the jet might break the protecting layer so that incorrect or unsharp characters or letters would appear. It is therefore a further object of this invention to spray the etching agent upon the film while the film is under pull in order to avoid the fore-mentioned defects. The proper length of the film loops may be adjusted by pushing the control knobs 21 and the shafts 19 inwardly in order to engage these parts with shafts 13, in which condition the upper return pulleys may be individually turned by means of the control knobs 21 in order to adjust the loop lengths. When rotating one of the shafts 13 in this way the friction pads inserted into the associated bevel gear 16 will glide on the discs 15 so that rotation is not transmitted to the shaft 23 and the other upper return pulleys.

A combination of the method according to this invention and the method disclosed in the U.S. Patent No. 2,051,603 to Hruska, cited above, in the manner that the etching agent is sprayed onto the film when the latter is passing through a bath of the etching agent is possible. Such a method may be carried out by means of the apparatus shown in the drawings when the etching agent is kept back in the etching chamber to a level above the uppermost nozzles. In this case the nozzles should be arranged at a smaller distance from the film than they are in the embodiment where etching is done in air. Of course, the casing would have to be executed liquid-tight up to the said level.

While this invention has been described and illustrated with reference to a specific embodiment thereof, it will be understood that other embodiments may be resorted to without departing from the invention. Therefore, the form of the invention set out above should be considered as illustrative and not as limiting the scope of the following claims.

What we claim is:

1. A method for producing explanatory texts for the pictures of a cinematographic film wherein the photographic layer of the film with the exception of portions thereof corresponding to the letters of the text to be produced are covered with a protective coating such as wax or paraffin, the method comprising providing an etching agent non-reactive with the protective coating, said etching agent being reactive with the photographic layer of the film for the removal thereof, providing a row of jet streams of said etching agent positioned along a portion of the length of the film, directing the jet streams against the film in a direction substantially perpendicular thereto, maintaining the jet streams with a flat cross-sectional shape at the point of impingement against the film of a width such that all of the letters of the text of the film are impacted, maintaining the jet streams with a cross-sectional thickness less than the height of the letters of the text, continuously maintaining the jet streams at a high pressure and at a high temperature sufficient under continued exposure to adversely affect the protective coating, said pressure being sufficient to press the protective coating against the photographic layer to prevent substantial undercoating of the photographic layer by the reactive agent, and continuously moving the photographic film past the jets at a rate sufficient so that said protective layer is substantially unaffected by said high pressure and said high temperature of the jet streams whereby the photographic layer is completely removed from the area corresponding to the letters of the text.

2. An apparatus for producing explanatory texts on the pictures of a cinematographic film, the apparatus comprising a row of spaced nozzles positioned along the length of the film, the nozzles each having a substantially circular opening, means for passing a stream of fluid through each of the nozzles, means for supporting the film and moving it past the nozzles, and means forming a plane deflecting surface interposed between each of the nozzles and the means for passing the film past the nozzles, said means in juxtaposition to the discharge opening of each of the nozzles so that the streams of fluid issuing from the nozzles are impinged against the plane deflecting surfaces and shaped to produce flat streams, the nozzles and the deflecting surfaces positioned so that the impingement of the streams against the film is at a direction approximately perpendicular to the direction of movement of the film, the relative size of the nozzles with respect to the position of the means forming the deflecting surface and the distance between the nozzles and the film being such that flat streams of fluid are adapted to be produced, the streams of fluid at the point of impingement with the film having a width at least equal to the width of the text of the film and the thickness of the streams being less than the height of the letters of the text.

References Cited in the file of this patent

UNITED STATES PATENTS

| | | |
|---|---|---|
| 1,643,234 | Baker | Sept. 20, 1927 |
| 2,051,603 | Hruska | Aug. 18, 1936 |
| 2,490,442 | Kagansky | Dec. 6, 1949 |
| 2,541,901 | Zademach et al. | Feb. 13, 1951 |
| 2,551,689 | Miller | May 8, 1951 |
| 2,762,149 | Mears | Sept. 11, 1956 |